US012799970B2

(12) United States Patent
Bame et al.

(10) Patent No.: US 12,799,970 B2
(45) Date of Patent: Nov. 17, 2026

(54) TORQUE LIMITING SCREW ASSEMBLY

(71) Applicant: WaveTherm Corporation, Raleigh, NC (US)

(72) Inventors: Rodney G Bame, Cary, NC (US); Daniel M. Leet, Cary, NC (US); Nazar N. Rush, Cary, NC (US)

(73) Assignee: WAVETHERM CORPORATION, Raleigh, NC (US)

(*) Notice: Subject to any disclaimer, the term of this patent is extended or adjusted under 35 U.S.C. 154(b) by 282 days.

(21) Appl. No.: 18/790,256

(22) Filed: Jul. 31, 2024

(65) Prior Publication Data

US 2026/0036159 A1 Feb. 5, 2026

(51) Int. Cl.
*F16B 31/02* (2006.01)

(52) U.S. Cl.
CPC .................................... *F16B 31/02* (2013.01)

(58) Field of Classification Search
CPC . B25B 23/141; B25B 13/462; B25B 23/1427; F16B 31/02
See application file for complete search history.

(56) References Cited

U.S. PATENT DOCUMENTS 3,368,602 A * 2/1968 Boyd ...................... F16B 39/24 411/964
3,405,595 A * 10/1968 Anders ................... F16B 23/00 411/405
3,425,314 A 2/1969 Ohlson
3,667,339 A 6/1972 Dame
4,512,697 A 4/1985 Cascini
4,687,392 A 8/1987 Bidwell
5,020,949 A 6/1991 Davidson et al.
5,795,116 A 8/1998 Frank et al.
5,813,298 A * 9/1998 Beattie .................. B25B 23/141 81/475
8,852,239 B2 * 10/2014 Jackson ............. A61B 17/7038 606/267
9,651,078 B2 5/2017 Santiago-Anadon
9,655,655 B2 * 5/2017 Haskins ............. A61B 17/7032
11,007,924 B2 * 5/2021 Jakobsmeyer ....... B60Q 1/0683
2005/0274230 A1 * 12/2005 Lin ..................... B25B 23/1427 81/58.3

(Continued)

FOREIGN PATENT DOCUMENTS

CA 3140617 A1 * 11/2020 ............ F16B 31/021
GB 1311877 A 3/1973
TW M598760 U * 7/2020 ......... B25B 23/0035

*Primary Examiner* — Eugene G Byrd
(74) *Attorney, Agent, or Firm* — COATS & BENNETT, PLLC

(57) ABSTRACT

A screw assembly with built-in torque limiting functionality has a shaft having a threaded lower section and a cap mounted on the shaft. The shaft includes a plurality of fingers that extend into the cap and that are pushed outward against the interior surface of the cap by a wedge pin to frictionally engage against the cap. When a tightening torque is applied to the cap, the torque is transmitted to the shaft until the static frictional force of the finger/cap interface is overcome, then the cap moves relative to the shaft, thereby limiting the tightening torque experienced by the threaded lower section. Optionally, a one-way rotation control mechanism is included that allows the screw assembly to be loosened with confidence.

16 Claims, 7 Drawing Sheets

(56) References Cited

U.S. PATENT DOCUMENTS

| | | | | |
|---|---|---|---|---|
| 2010/0305621 | A1* | 12/2010 | Wang | A61B 17/7037 606/305 |
| 2020/0370588 | A1* | 11/2020 | Maloney | F16B 31/021 |
| 2026/0036159 | A1* | 2/2026 | Bame | B25B 23/141 |

* cited by examiner

TORQUE LIMITING SCREW ASSEMBLY

BACKGROUND

The present invention relates to a screw assembly that limits tightening torque.

To tighten a screw, a tightening torque is applied to the screw. In some screw applications, it is desirable to limit the amount of torque that is applied to the threaded area of the screw, so as to limit the possibility of overtightening and possible damage. Several approaches to limiting the tightening torque have been proposed. One approach is to use a torque limited driver to tighten the screw, but some users may not have access to such tools or may not desire to use such tools. Therefore, some other approaches build the torque limiting into the screw assembly itself, such as by incorporating inter-engaging ramped surfaces as illustrated by U.S. Pat. No. 5,020,949, or by including deformable exterior surfaces on the head of the screw as illustrated by U.S. Pat. No. 9,651,078. However, such approaches may be difficult and/or costly to manufacture and may also be inappropriate for some small size screw assemblies.

Thus, while the above arrangements have proven satisfactory for many situations, they may be less than satisfactory for others. As such, there remains a need for alternative designs for torque limiting screw assemblies.

SUMMARY

The present invention provides a screw assembly with built-in torque limiting functionality, and related assemblies and methods. The screw assembly generally includes a shaft having a threaded lower section and a cap that is mounted on the shaft. The shaft includes a plurality of fingers that extend into the cap and that are pushed outward against the interior surface of the cap by a wedge pin. The fingers are thus frictionally engaged against the cap. When a tightening torque is applied to the cap, the torque is transmitted to the shaft until the static frictional force of the finger/cap interface is overcome, then the cap moves relative to the shaft, thereby limiting the tightening torque experienced by the threaded lower section. In some embodiments, the torque level can be set by proper placement of the wedge pin. Also, in some embodiments, the screw assembly further includes a one-way rotation control mechanism, such as a ratcheting mechanism, that allows the screw assembly to be loosened with confidence.

In one embodiment, the torque-limited screw assembly comprises a shaft, a cap, and a wedge pin. The shaft extends along a longitudinal axis. The shaft has a lower section that is threaded, an upper section configured for force-transfer, and a head section between the lower section and the upper section. The upper section includes two or more fingers separated from each other by gap and extending upward away from the head section. The upper sections also includes a recess disposed between the fingers and disposed along the longitudinal axis. The cap is disposed over the fingers and may have an upper tool-receiving recess. The cap has an interior recess configured to receive the fingers, with the interior recess having an inner surface. The wedge pin is disposed in the recess of the upper section so as to force the fingers outward to frictionally engage against the inner surface. The screw assembly is configured such that the cap and shaft are rotationally coupled for tightening up to a torque limit via frictional engagement of the fingers against the inner surface such that: 1) a tightening force up to the torque limit applied to the cap causes the cap and shaft to rotate together; and 2) a tightening force above the torque limit applied to the cap causes the cap to rotate relative to the shaft while being retained on the shaft.

In another embodiment, the torque-limited screw assembly comprises a shaft, a cap, and a wedge pin. The shaft extends along a longitudinal axis. The shaft has a lower section that is threaded, an upper section configured for force-transfer, and a head section between the lower section and the upper section. The upper section includes: 1) two or more fingers separated from each other by gap and extending upward away from the head section; and 2) a recess disposed between the fingers along the longitudinal axis. The cap is disposed over the upper section and may have an upper tool-receiving recess. The cap has an interior recess, with the interior recess having an inner surface. The wedge pin is disposed in the pocket of the upper section. The fingers abut the inner surface of the cap, with the wedge applying an outward force against the fingers to push the fingers outward against the inner surface. The screw assembly is configured such that the cap and shaft are rotationally coupled for tightening up to a torque limit via frictional engagement of the fingers against the inner surface such that: 1) a tightening force up to the torque limit applied to the cap causes the cap and shaft to rotate together; and 2) a tightening force above the torque limit applied to the cap causes the cap to rotate in a tightening direction relative to the shaft while being retained on the shaft.

In another embodiment, the torque-limited screw assembly comprises a shaft and a cap. The shaft extends along a longitudinal axis. The shaft has a lower section that is threaded, an upper section configured for force-transfer, and a head section between the lower section and the upper section. The cap is disposed over the upper section. The screw assembly includes means for limiting tightening torque transmitted to the lower section to a torque limit, with that means including the cap and at least part of the upper section.

In some embodiments, the screw assembly further includes a one-way rotation control mechanism that selectively inhibits relative rotation between the shaft and the cap based on a direction of applied force, so that relative rotation is allowed in one direction but inhibited in the opposing direction. In some embodiments with the one-way rotation control mechanism, the cap has a lower opening with a perimeter having a plurality of ramps and catches. In such embodiments, the one-way rotation control mechanism comprises a ratcheting mechanism with: 1) one or more spring arms rotationally affixed to the shaft, and 2) the plurality of ramps and catches. The one or more spring arms and the cap cooperate to couple the cap and shaft for loosening via engagement of the one or more arms with the catches such that a loosening force applied to the cap is transmitted to the lower section.

Various other aspects and embodiments are also disclosed, which may be employed alone or in any combination.

DESCRIPTION

Figure 1:
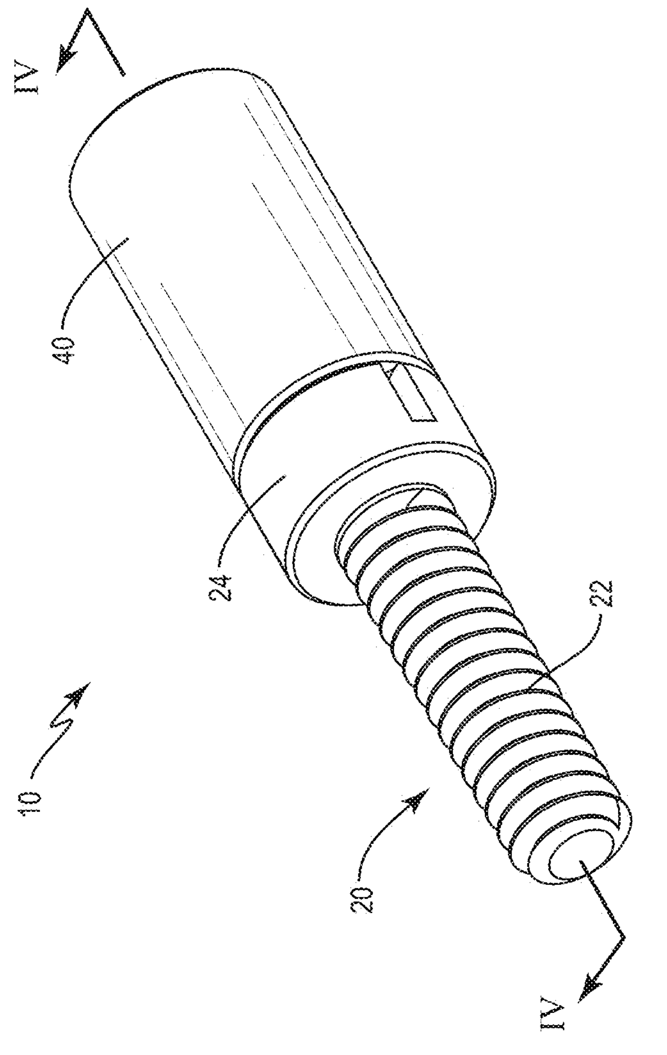
FIG. 1 shows a perspective view of a screw assembly according to one or more embodiments

The present disclosure is generally directed to a screw assembly 10 with built-in torque limiting functionality. The screw assembly 10 generally includes a shaft 20 having a threaded lower section 22 and a cap 40 that is mounted on the shaft 20. The shaft 20 includes a plurality of fingers 32 that extend into the cap 40 and that are pushed outward against the interior surface of the cap 40 by a wedge pin 70. The fingers 32 are thus frictionally engaged against the cap 40. When a tightening torque is applied to the cap 40, the torque is transmitted to the shaft 20 until the static frictional force of the finger/cap 40 interface is overcome, then the cap 40 moves relative to the shaft 20, thereby limiting the tightening torque applied to the threaded lower section 22. In some embodiments, the torque level can be set by proper placement of the wedge pin 70. Also, in some embodiments, the screw assembly 10 further includes a one-way rotation control mechanism, such as a ratcheting mechanism 94, that allows the screw assembly 10 to be loosened with confidence.

Figure 2:
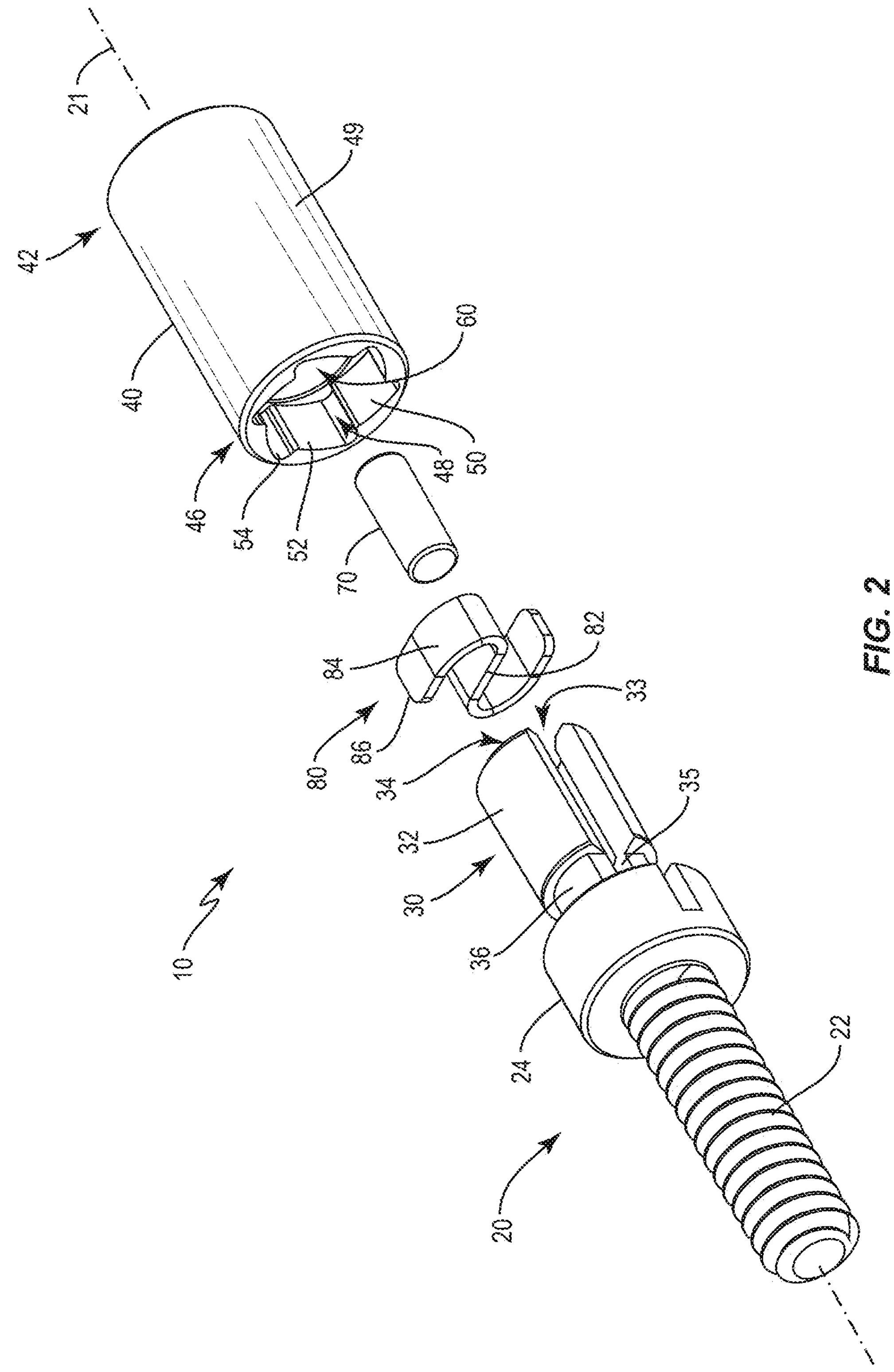
FIG. 2 shows an exploded view of the screw assembly of FIG. 1.
Figure 3:
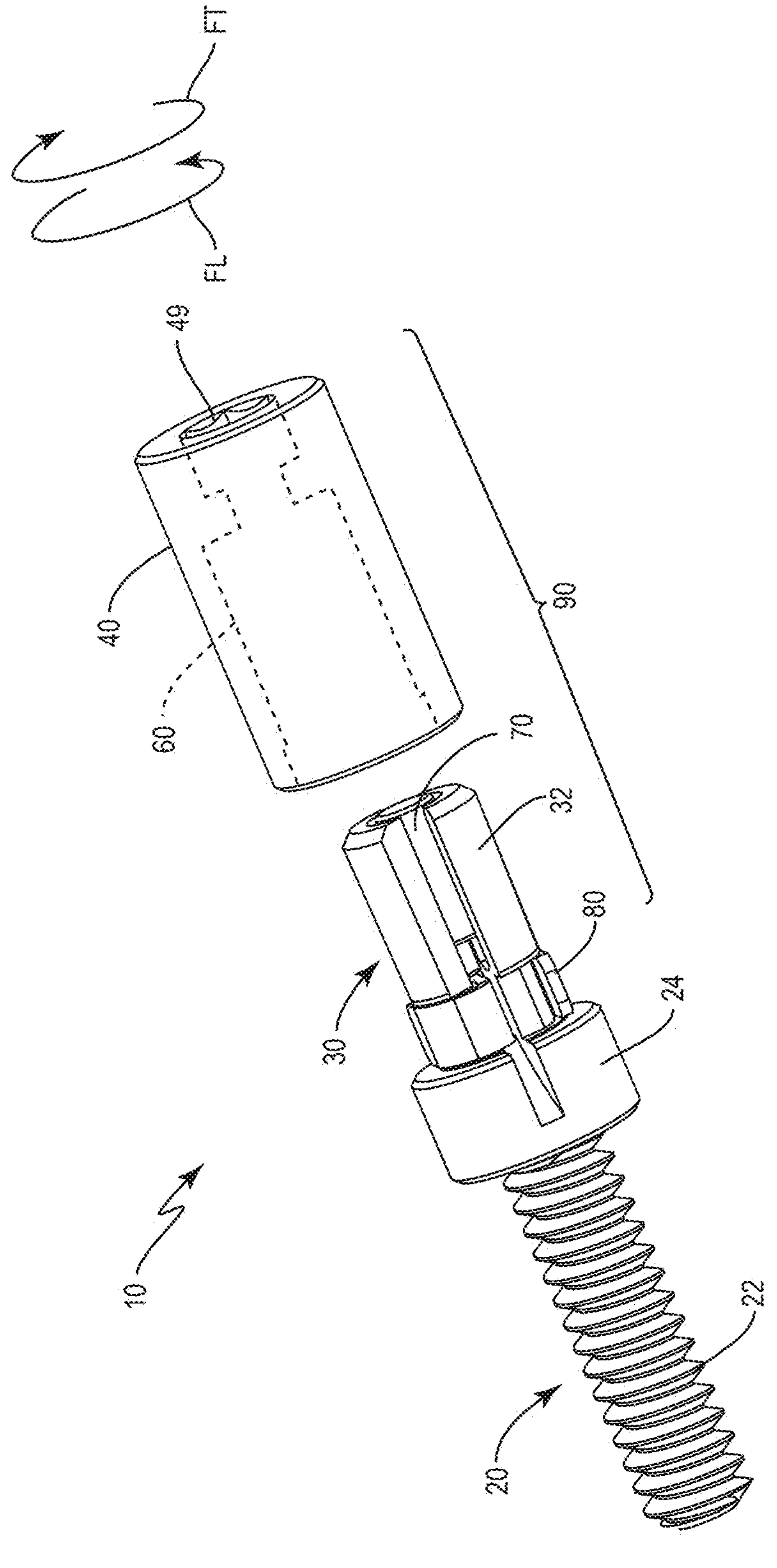
FIG. 3 shows a partially exploded view of the screw assembly of FIG. 1.
Figure 4:
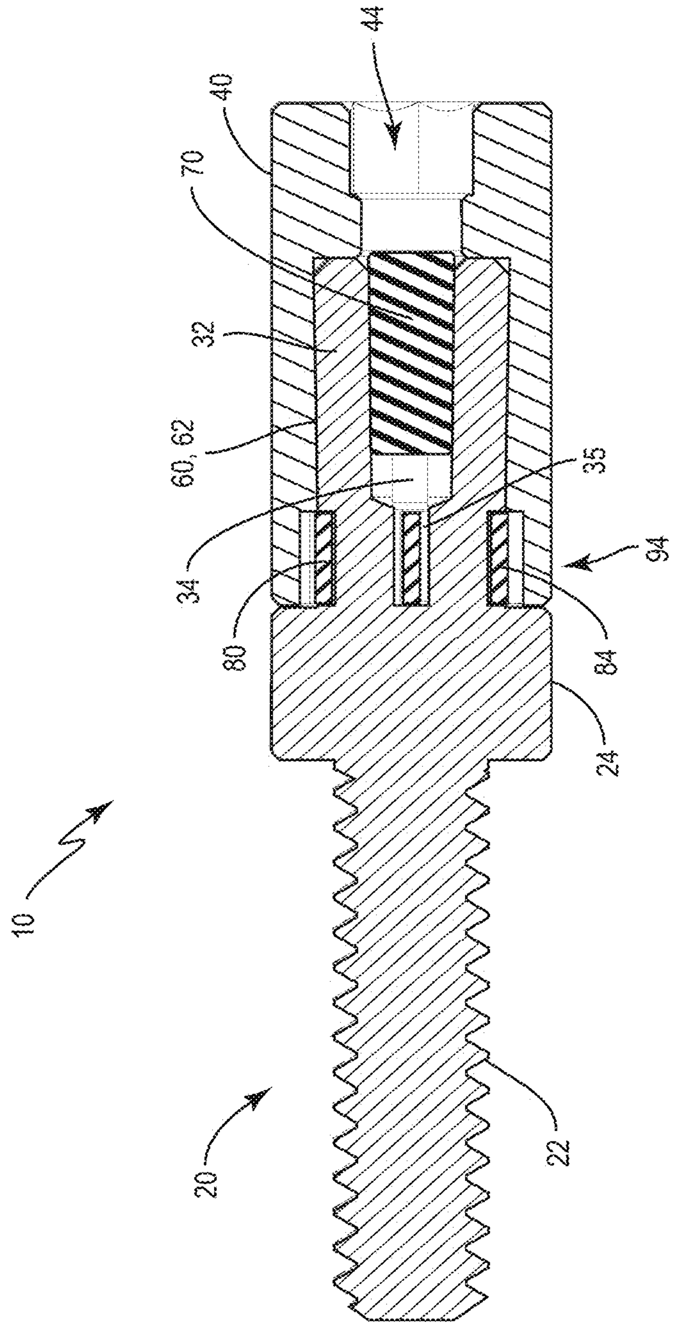
FIG. 4 shows a cross-sectional view of the screw assembly of FIG. 1 along the longitudinal axis.

In one embodiment illustrated in FIGS. 1-4, an exemplary screw assembly 10 includes a shaft 20, a cap 40, a wedge pin 70 and a spring 80. The shaft 20 is elongate along longitudinal axis 21 and includes a lower section 22, a head section 24, and an upper section 30 in series. The lower section 22 is threaded with any suitable threading known in the art. The head section 24 is disposed between the lower section 22 and the upper section 30, and is enlarged relative to the lower section 22. The side notches on the head section 24 illustrated in FIGS. 1-3 are optional but may facilitate machining of the shaft 20. The upper section 30 functions as a force-transfer section and extends upward from the head section 24 with two or more fingers 32 that extend away from the head section 24 in cantilever fashion. The outer faces of the fingers 32 may optionally be tapered slightly inward toward the head section 24. The fingers 32 are peripherally spaced from each by gaps 33. A recess or pocket 34 extends longitudinally between the fingers 32 and is advantageously generally cylindrical. Note that the pocket 34 may advantageously be slightly tapered so as to narrow downward toward the head section 24. The pocket 34 is sized to receive the wedge pin 70, as discussed further below. In the illustrated embodiment, the lower end of the pocket 34 forms a slot 35, which is sized to receive the spring 80 as discussed further below. The slot 35 is advantageously positioned in a reduced diameter portion 36 of the upper section 30, proximate the head section 24.

The cap 40 in FIGS. 1-4 is generally cylindrical, with an upper end section 42 and a lower end section 46. The upper end section 42 includes a tool cavity 44 configured to receive a driving tool. The tool cavity 44 has an appropriately shaped perimeter for engaging the driving tool, such as hexagonal shape for an Allen wrench, a cross shape for a Phillips head driver, a star type shape for a TORX head driver, or any other suitable shape known in the art. The lower end section 46 includes an opening 48 for receiving the upper section 30 of the shaft 20. This opening 48 is optionally not circularly shaped, but instead has a perimeter 50 that includes a series of ramps 52 and catch areas 54 for interacting with the spring 80 to provide a one-way ratcheting mechanism 94. The exterior 49 of the cap 40 may be smooth or textured as is desired. The interior of the cap 40 includes a longitudinal passage 60 that extends entirely through the cap 40, with the ends of the passage 60 forming the tool cavity 44 and the opening 48, respectively. The passage 60 is configured to receive the fingers 32 so that the passage 60 overlaps the upper portions of the fingers 32. The interior surface 62 of the passage 60, between the tool cavity 44 and the opening 48, is advantageously cylindrical or slightly conical, and is intended to frictionally engage the fingers 32 during operation of the screw assembly 10.

The wedge pin 70 is disposed in the pocket 34 (partially or advantageously wholly) in the upper section 30 of the shaft 20. The wedge pin 70 may be generally cylindrical, but is advantageously slightly frustoconical with a inward taper downward toward the head section 24. The wedge pin 70 is configured to press against the fingers 32 so as to urge the fingers 32 outward into contact with the interior surface 62 of the passage 60 in the cap 40. In some embodiments, the wedge pin 70 is a simple pin; in other embodiments, the wedge pin 70 may take the form of an appropriately shaped set screw (with corresponding threads on the interior faces of the fingers 32). Note that the wedge pin 70 is disposed relative to the shaft 20 and the cap 40 so that the cap 40 entirely overlaps the wedge pin 70.

The spring 80 is advantageously generally S-shaped, with a center section 82 that is generally straight disposed between a pair of generally oppositely facing arms 84 that terminate at tips 86. The center section 82 is disposed in the slot 35 between the wedge pin 70 and the head section 24. The arms 84 extend partially around corresponding fingers 32. The spring 80 is configured to be received in the lower opening 48 of the cap 40, with the tips 86 either resting in corresponding catch areas 54 or pressing against corresponding ramps 52 of the perimeter 50. The interaction of the tips 86 and the perimeter 50 of the opening 48 provide a one-way ratcheting mechanism 94 as the cap 40 is rotated relative to the shaft 20. The spring 80 is configured to allow rotation of the cap 40 relative to the shaft 20 in a tightening direction FT by having the tips 86 ride along the ramps 52, but to prevent rotation of the cap 40 relative to the shaft 20 when the cap 40 is turned in a loosening direction FL by having the tips 86 abut against the perimeter wall 50 of the opening 48 in the catch areas 54. In effect, the tips 86 act as pawls for the ratcheting mechanism 94.

To assemble the screw assembly 10, the spring 80 is loaded onto the shaft 20, with the center section 82 resting in the slot 35, and the arms 84 extending partially around the fingers 32 in the reduced diameter section 36. The fingers 32 are then pressed slightly inward and the cap 40 placed over the fingers 32. When the cap 40 is in position, the fingers 32 rebound outward somewhat so that the cap 40 is held on the shaft 20, but is able to spin relative thereto. The wedge pin 70 is then inserted into the shaft 20 by passing through the tool cavity 44 and into the pocket 34. As the wedge pin 70 in pushed farther into the pocket 34, the wedge pin 70 forces the fingers 32 outward into greater frictional engagement with the interior surface of the passage 60 in the cap 40. This functionally sets the amount of static frictional resistance at the finger 32/cap 40 interface, which in turn sets the effective torque limit of the screw assembly 10. The torque limit may be set by the insertion depth and/or force used to insert the wedge pin 70 into the pocket 34. Note also that the presence of the wedge pin 70 prevents the fingers 32 from being displaced inward, thereby further preventing the cap 40 from being removed from the shaft 20 in conjunction with the optional tapers of the fingers 32 and the passage 60.

When a tightening force is applied to the cap 40, such as via a driver tool being inserted into the tool cavity 44 and being rotated in a tightening direction FT, the cap 40 and the shaft 20 are initially rotationally coupled so as to rotate together due to the frictional interaction of the fingers 32 abutting against the interior surface 62 of the passage 60 of the cap 40. Once a tightening torque above the torque limit is applied, the static friction between the fingers 32 and the cap 40 is overcome, and the cap 40 is allowed to rotate relative to the shaft 20. Thus, the cap 40 and the shaft 20 rotate together until the torque limit is reached, and then the cap 40 rotates relative to the shaft 20. Accordingly, when a torque at or below the torque limit is applied, that torque is transmitted to the shaft 20, but when a torque greater than the torque limit is applied, that full torque is not transmitted to the shaft 20, and the threaded lower section 22 is not subjected to that torque. As can be seen, the fingers 32, cap 40 with passage 60, and wedge pin 70 together act as a torque-limiting mechanism 90 for the screw assembly 10.

In some embodiments, the screw assembly 10 does not include a one-way rotation control mechanism, so the slot 35, spring 80, and ramps 52 and catch areas 54 of the lower opening 48 are optional. However, in preferred embodiments, the screw assembly 10 includes a one-way rotation control mechanism that allows the cap 40 to rotate relative to the shaft 20 when tightening (with greater torque than the torque limit), but couples the cap 40 to the shaft 20 to inhibit relative rotational motion when a torque is applied in the loosening direction FL. As such, the screw assembly 10 can be loosened with confidence because the loosening torque applied to the cap 40 is transmitted to the shaft 20. In the embodiment illustrated in FIG. 2-4, the one-way rotation control mechanism takes the form of a ratcheting mechanism 94 that includes the spring 80 and the ramps 52 and catch areas 54 of the lower opening 48. When tightening, the arms 84 of the spring 80 are iteratively flexed as the tips 86 move alternately along the ramps 52 and into/out of the catch areas 54 when the cap 40 rotates relative to the shaft 20. When loosening, the static friction between the fingers 32 and the cap 40 may keep the two rotationally coupled. But if the applied loosening torque is enough to overcome that static friction, then the cap 40 may attempt to rotate relative to the shaft 20. However, because the spring 80 is constrained to rotate with the shaft 20, and the geometry of the catch areas 54 catching the tips of the spring 80, the shaft 20 is forced to rotate with the cap 40.

Figure 5:
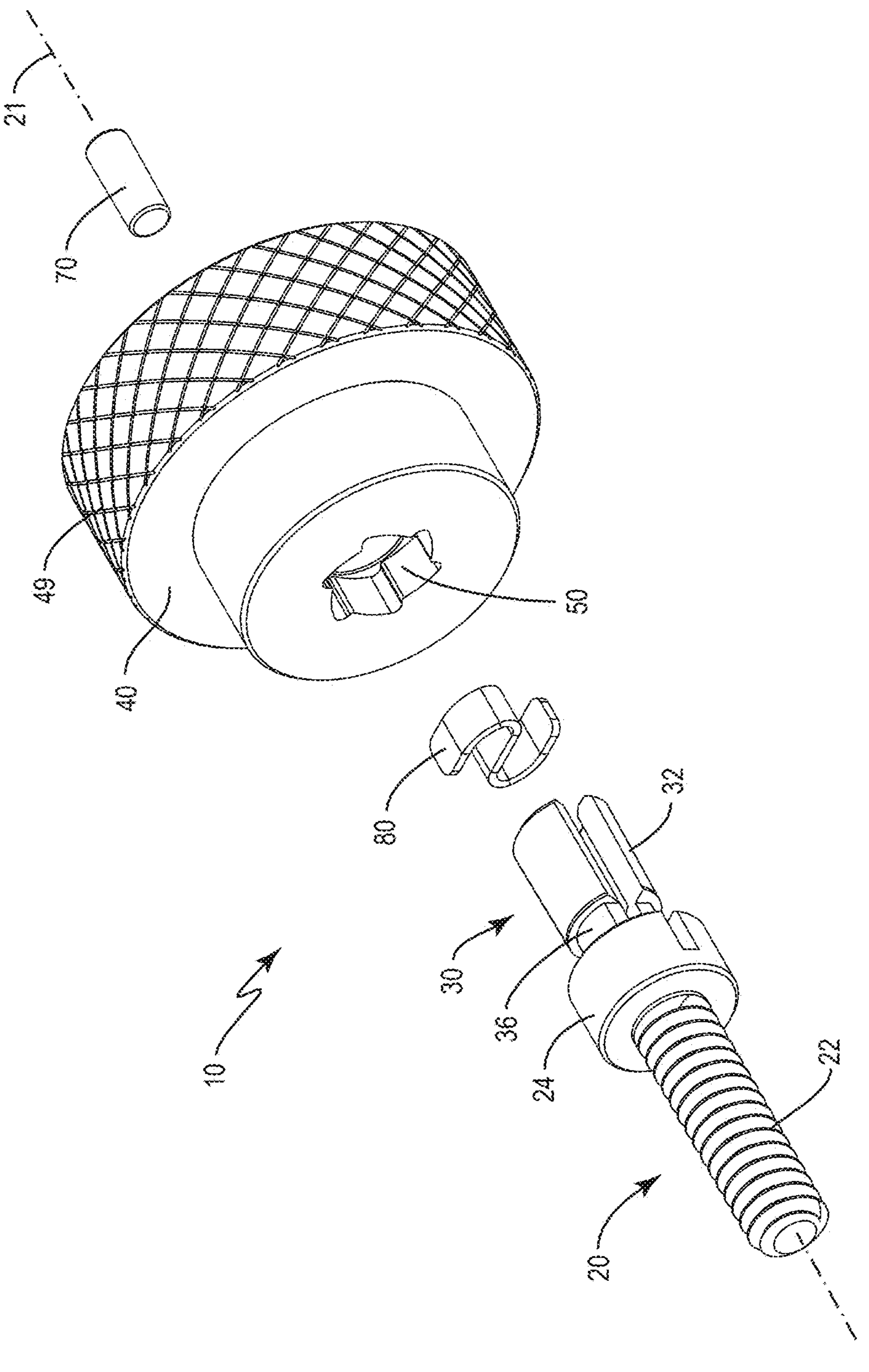
FIG. 5 shows an exploded view of an alternative embodiment of the screw assembly.
Figure 6:
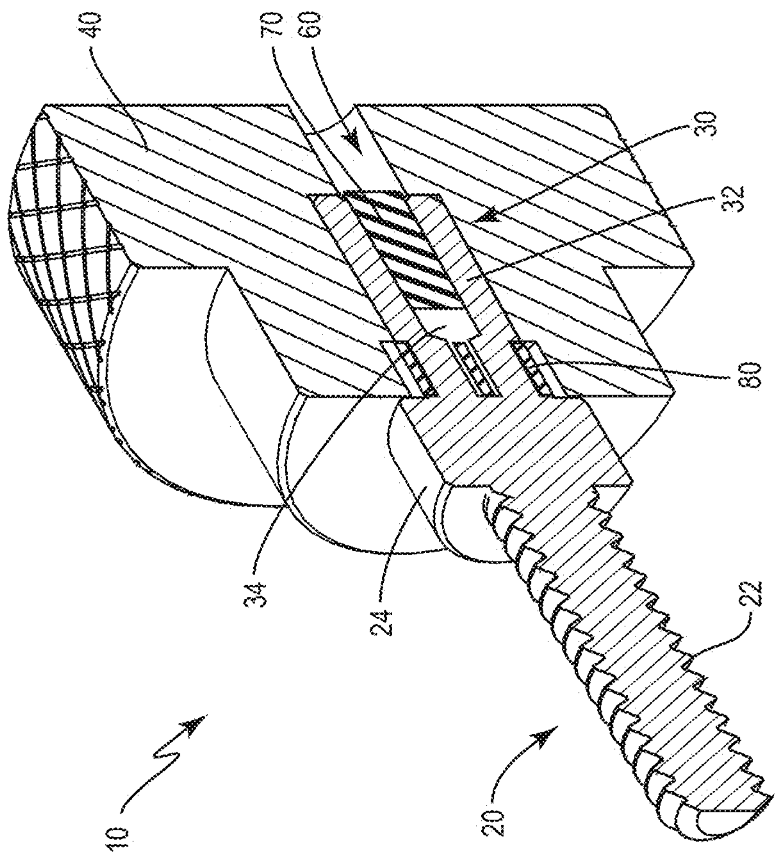
FIG. 6 shows a perspective cross-sectional view of the screw assembly of FIG. 5.

The above discussion has generally been in the context of the cap 40 being driven to a tool engaging the cap 40 in the tool cavity 44. Thus, the tightening torque, and optionally loosening torque, is applied to the screw assembly 10 at an interior of the cap 40 (nearer the longitudinal axis 21). However, in some embodiments, these torques may alternatively or additionally be applied to the exterior 49 of the cap 40, such as by manually gripping the exterior 49 of the cap 40. For example, the screw assembly 10 of FIGS. 5-6 is similar to the screw assembly of FIGS. 1-4, and operates in the same basic fashion, but has a cap 40 with an enlarged textured exterior 49 (significantly larger than the head section 24) intended for gripping (optionally manual gripping), and may optionally omit the tool cavity 44. The passage 60 of such a cap 40 should still be open on both ends so as to allow insertion of the fingers 32 and the wedge pin 70 (for setting of the torque limit). In some embodiments, the torques may be applied to a faceted or other feature on the exterior of the cap 40, such as a faceted boss on the upper end section 42 disposed along longitudinal axis 21, or a series of facets along the perimeter of the upper end section 42 conceptually similar to those on a conventional automobile engine oil filter.

The above discussion has generally been in the context of the spring 80 of the ratcheting mechanism 94 having two arms 84. In alternative embodiments, the spring 80 may have a single arm 84, or more than two arms 84. Further, other forms of one-way rotation control mechanisms may additionally or alternatively be employed, such as spring biased inter-engaging ramped surfaces, a spring biased pawl on the shaft 20 (advantageously oriented generally perpendicular to axis 21) and appropriately contoured teeth on the cap 40 (or vice versa), other teeth and pawl ratcheting mechanisms, steel balls rolling between indented plates, and other one-way rotation control mechanisms known in the mechanical arts.

The above discussion has generally been in the context of the lower section 22 of shaft 20 being externally threaded. In alternative embodiments, the lower section 22 may be additionally or alternatively internally threaded.

Figure 7:
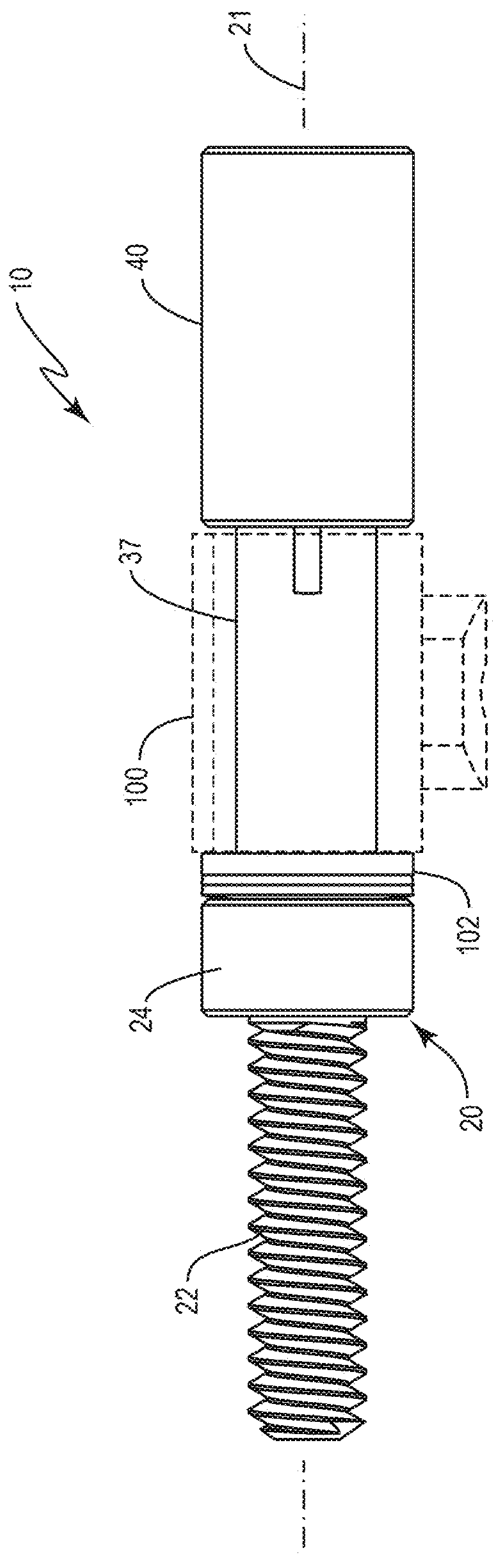
FIG. 7 shows a side view of another alternative embodiment, with an extended spacer section on the shaft, and an associated mounting block with washers.

The screw assemblies 10 illustrated in FIGS. 1-6 has the recess 34 extending downward toward the head section 24 so as to terminate at or near the upper end of the head section 24. Thus, the end face of cap 40 in lower end section 46 can be located very close to, or optionally abut, the head section 24. However, such is not required. In some embodiments of the screw assembly 10, the upper section 30 of shaft 20 may have an optional spacer portion 37 disposed between the head section 24 and the (optional) slot 35 and recess 34, allowing the cap 40 to be spaced further from the head section 24. An example of such an arrangement is shown in FIG. 7, where the spacer section 37 is shown extending through a mounting block 100. The mounting block 100 may be fixed in position by mounting to, e.g., a circuit board via any suitable means, which in turn longitudinally fixes the screw assembly 10 in position. Note that one or more optional washers 102, which may be flat and/or spring type, may be disposed between the mounting block 100 and head section 24.

Note that in FIG. 3, the tightening direction FT is shown as clockwise and the loosening direction TL is shown as counter-clockwise. In some embodiments, this is reversed to accommodate a different sense (direction) of threads such that the tightening direction FT is counter-clockwise and the loosening direction TL is clockwise (with corresponding changes to the one-way rotation control mechanism 94 if present, e.g., the profile of the perimeter 50). Further, it should be noted that the lower section 22 has been illustrated with a single uniform thread for convenience; in some embodiments, the lower section 22 may have two or more thread portions with the same or different threads, in the same or opposite directions.

The screw assembly 10 of the present invention may be used in a variety of situations where control of tightening torque may be desired, for example as a drive screw in a wedge based circuit board retainers, such as that disclosed in U.S. Pat. No. 8,456,846.

Like terms refer to like elements throughout the description. Spatially relative terms such as “under”, “below”, “lower”, “over”, “upper”, and the like, are used for ease of description to explain the positioning of one element relative to a second element. These terms are intended to encompass different orientations of the device in addition to different orientations than those depicted in the figures. Further, terms such as “first”, “second”, and the like, may also be used to describe various elements, regions, sections, etc. and are also not intended to imply a particular sequence. In various embodiments, the present invention has one or more of the above attributes, alone or in any combination.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A torque-limited screw assembly, comprising:

a shaft extending along a longitudinal axis; the shaft having a lower section that is threaded, an upper section configured for force-transfer, and a head section between the lower section and the upper section; wherein the upper section includes:

two or more fingers separated from each other by gap and extending upward away from the head section; and a recess disposed between the fingers along the longitudinal axis;

a cap disposed over the fingers; the cap having an interior recess configured to receive the fingers and having an inner surface; wherein the cap has a lower opening with a perimeter having a plurality of ramps and catches;

a wedging element disposed in the recess of the upper section so as to force the fingers outward to frictionally engage against the inner surface;

wherein the screw assembly is configured such that the cap and shaft are rotationally coupled for tightening up to a torque limit via frictional engagement of the fingers against the inner surface such that:

a tightening force up to the torque limit applied to the cap causes the cap and shaft to rotate together; and a tightening force above the torque limit applied to the cap causes the cap to rotate relative to the shaft while being retained on the shaft;

a one-way rotation control mechanism that selectively inhibits relative rotation between the shaft and the cap based on a direction of applied force; wherein the rotation control mechanism comprises:

one or more spring arms rotationally affixed to the shaft;

the plurality of ramps and catches;

wherein the one or more spring arms and the cap cooperate to couple the cap and shaft for loosening via engagement of the one or more arms with the catches such that a loosening force applied to the cap is transmitted to the lower section.

2. The screw assembly of claim 1:

wherein the upper section of the shaft includes a slot disposed between the fingers;

wherein the spring extends through the slot and has at least two arms with tips and extending partially around corresponding fingers.

3. The screw assembly of claim 1, wherein the lower section is externally threaded.

4. The screw assembly of claim 1, wherein the cap is larger, normal to the longitudinal axis, than the shaft.

5. The screw assembly of claim 1, wherein an exterior of the cap is textured for gripping.

6. The screw assembly of claim 1, wherein the cap has an upper tool-receiving recess.

7. The screw assembly of claim 1, wherein the wedging element is a wedge pin that is frustoconical.

8. The screw assembly of claim 7, wherein the wedge pin is unthreaded.

9. A torque-limited screw assembly, comprising:

a shaft extending along a longitudinal axis; the shaft having a lower section that is threaded, an upper section configured for force-transfer, and a head section between the lower section and the upper section; wherein the upper section includes:

two or more fingers separated from each other by gap and extending upward away from the head section; and a pocket disposed between the fingers along the longitudinal axis;

a cap disposed over the upper section; the cap having an interior recess with an inner surface; wherein the cap has a lower opening with a perimeter having a plurality of ramps and catches;

a wedging element disposed in the pocket;

wherein the fingers abut the inner surface of the cap;

wherein the wedging element applies outward force against the fingers to push the fingers outward against the inner surface;

wherein the screw assembly is configured such that the cap and shaft are rotationally coupled for tightening up to a torque limit via frictional engagement of the fingers against the inner surface such that:

a tightening force up to the torque limit applied to the cap causes the cap and shaft to rotate together; and a tightening force above the torque limit applied to the cap causes the cap to rotate in a tightening direction relative to the shaft while being retained on the shaft;

a one-way rotation control mechanism that selectively inhibits relative rotation between the shaft and the cap based on a direction of applied force; wherein the rotation control mechanism comprises:

one or more spring arms rotationally affixed to the shaft;

the plurality of ramps and catches;

wherein the one or more spring arms and the cap cooperate to couple the cap and shaft for loosening via engagement of the one or more arms with the catches such that a loosening force applied to the cap is transmitted to the lower section.

10. The screw assembly of claim 9:

wherein the upper section of the shaft includes a slot disposed between the fingers;

wherein the spring extends through the slot and has at least two arms with tips and extending partially around corresponding fingers.

11. The screw assembly of claim 9, wherein the lower section is externally threaded.

12. The screw assembly of claim 9, wherein the cap is larger, normal to the longitudinal axis, than the shaft.

13. The screw assembly of claim 9, wherein an exterior of the cap is textured for gripping.

14. The screw assembly of claim 9, wherein the cap has an upper tool-receiving recess.

15. The screw assembly of claim 14, wherein the wedging element is a wedge pin that is frustoconical.

16. A torque-limited screw assembly, comprising:

a shaft extending along a longitudinal axis; the shaft having a lower section that is threaded, an upper section configured for force-transfer, and a head section between the lower section and the upper section;

a cap disposed over the upper section; wherein the cap has a lower opening with a perimeter having a plurality of ramps and catches;

means for limiting tightening torque transmitted to the lower section to a torque limit; the means including the cap and at least part of the upper section;

a one-way rotation control mechanism that selectively inhibits relative rotation between the shaft and the cap based on a direction of applied force; wherein the rotation control mechanism comprises:

one or more spring arms rotationally affixed to the shaft;

the plurality of ramps and catches;

wherein the one or more spring arms and the cap cooperate to couple the cap and shaft for loosening via engagement of the one or more arms with the catches such that a loosening force applied to the cap is transmitted to the lower section.

* * * * *